(12) United States Patent
Hodge et al.

(10) Patent No.: US 11,215,243 B2
(45) Date of Patent: Jan. 4, 2022

(54) SWITCHABLE I-BRAKE FOR HYBRID TRANSMISSION

(71) Applicant: Schaeffler Technologies AG & Co. KG, Herzogenaurach (DE)

(72) Inventors: Michael Hodge, Creston, OH (US);
Peter Burke, Charlotte, NC (US);
James Copeland, Massillon, OH (US);
Jordan Geiser, Dalton, OH (US);
Kenneth Hunt, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/061,924

(22) Filed: Oct. 2, 2020

(65) Prior Publication Data
US 2021/0102586 A1 Apr. 8, 2021

Related U.S. Application Data

(60) Provisional application No. 62/910,115, filed on Oct. 3, 2019.

(51) Int. Cl.
*F16D 41/16* (2006.01)
(52) U.S. Cl.
CPC .................. *F16D 41/16* (2013.01)
(58) Field of Classification Search
CPC ....................................................... F16D 41/16
See application file for complete search history.

(56) References Cited

U.S. PATENT DOCUMENTS

| | | | |
|---|---|---|---|
| 6,244,965 B1 | 6/2001 | Klecker et al. | |
| 6,481,551 B1 | 11/2002 | Ruth | |
| 9,109,636 B2 | 8/2015 | Kimes et al. | |
| 9,121,454 B2 | 9/2015 | Pawley | |
| 10,563,710 B2* | 2/2020 | Shioiri | F16D 41/14 |
| 10,697,503 B1* | 6/2020 | Burke | F16D 11/16 |
| 10,865,838 B2* | 12/2020 | Burke | F16D 41/16 |
| 10,871,194 B2* | 12/2020 | Burke | F16D 41/04 |
| 11,047,431 B2* | 6/2021 | Burke | F16D 43/202 |
| 2008/0000747 A1* | 1/2008 | Saka | F16D 41/125 192/43.2 |

(Continued)

FOREIGN PATENT DOCUMENTS

WO 2018157236 A1 9/2018

*Primary Examiner* — David R Morris
(74) *Attorney, Agent, or Firm* — LeKeisha M. Suggs

(57) ABSTRACT

A clutch assembly comprises an actuation assembly, an outer ring, and an inner ring disposed radially inward of the outer ring and rotatable about an axis in first and second rotational directions. A first and second strut are rotatably disposed within first and second pockets of the outer ring and configured to be rotated by the actuation assembly. A first pawl and a second pawl are rotatably disposed within a third pocket and a fourth pocket, respectively. For a transition mode, the actuation assembly is configured to rotate the first strut within the first pocket such that rotation of the first strut in the first rotational direction urges the first pawl radially inward into partial engagement with teeth disposed on an outer surface of the inner ring, the second pawl remains free of contact with the inner ring and the inner ring rotates in the first rotational direction.

12 Claims, 6 Drawing Sheets

(56) References Cited

U.S. PATENT DOCUMENTS

| | | | |
|---|---|---|---|
| 2009/0266667 A1* | 10/2009 | Samie | F16D 41/12 |
| | | | 192/43.1 |
| 2018/0266502 A1 | 9/2018 | Shioiri et al. | |
| 2019/0345995 A1* | 11/2019 | Brezger | F16D 41/069 |
| 2021/0054886 A1* | 2/2021 | Burke | F16D 41/14 |
| 2021/0131506 A1* | 5/2021 | Burke | F16D 41/12 |
| 2021/0164526 A1* | 6/2021 | Kimes | F16D 41/04 |

* cited by examiner

SWITCHABLE I-BRAKE FOR HYBRID TRANSMISSION

TECHNICAL FIELD

The present disclosure generally relates to clutch assemblies and more particularly clutch assemblies for hybrid transmission applications.

BACKGROUND

A clutch is a device used to selectively couple components such as a pair of rotating shafts or the like. A clutch may also be used to ground a rotating component to a fixed structure such as a housing. Here, the clutch is typically referred to as a brake. Clutches may be bidirectional, lock in both directions, or one-way, lock in one direction and freewheel in the other.

SUMMARY

Embodiments disclose clutch assembly that comprises an actuation assembly, an outer ring, and an inner ring disposed radially inward of the outer ring and rotatable about an axis in a first rotational direction and a second rotational direction opposite the first rotational direction. A first strut and a second strut are rotatably disposed within a first pocket and a second pocket, respectively, of the outer ring, wherein the first strut and the second strut are configured to be rotated by the actuation assembly. A first pawl and a second pawl are rotatably disposed within a third pocket and a fourth pocket, respectively, of the outer ring, wherein the first pawl is arranged to be rotated by the first strut and the second pawl is arranged to be rotated by the second strut. For a transition mode, the actuation assembly is configured to rotate the first strut within the first pocket such that rotation of the first strut in the first rotational direction urges the first pawl radially inward into partial engagement with teeth disposed on an outer surface of the inner ring, the second pawl remains free of contact with the inner ring and the inner ring rotates in the first rotational direction.

In embodiments, to shift from the transition mode to a freewheel mode, the actuation assembly is arranged to rotate the first strut in the second rotational direction such that the first strut is no longer urging the first pawl radially inward and the first pawl rotates into a biased retracted position free of contact with the teeth such that the inner ring is free to rotate in the first and the second rotational directions. To shift from the transition mode to a locked mode: the inner ring is rotated in the second rotational direction forcing the first pawl into full engagement with the teeth of the inner ring; the first strut is rotated further in the first rotational direction; and the actuation assembly is arranged to rotate the second strut in the first rotational direction such that rotation of the second strut urges the second pawl into full engagement with the teeth of the inner ring. Moreover, the actuation assembly may include an actuation plate configured to displace in a first axial direction or a second, opposite axial direction to rotate the first strut and the second strut within the first pocket and the second pocket, respectively.

In embodiments, the first pocket and the second pocket may each include a first wall and a second wall opposite the first wall connected via a circumferential wall. For the freewheel mode, the first strut may contact the first wall of the first pocket and the second strut may contact the first wall of the second pocket. For the transition mode, the first strut may be rotated in the first rotational direction to a position between the first and the second walls of the first pocket and the second strut may contact the first wall of the second pocket. For the locked mode, the first strut may be rotated further in the first rotational direction such that the first strut contacts the second wall of the first pocket and the second strut may be rotated in the first rotational direction such that it contacts the second wall of the second pocket.

Embodiments disclose a clutch assembly that comprises an actuation assembly, an outer ring, and an inner ring disposed radially inward of the outer ring and rotatable about an axis in a first rotational direction and a second rotational direction opposite the first rotational direction. A strut is rotatably disposed within a first pocket of the outer ring, wherein the actuation assembly is arranged to rotate the strut within the first pocket. A first pawl and a second pawl may be rotatably disposed within a second pocket and a third pocket, respectively, of the outer ring, wherein the strut is configured to urge the first pawl and the second pawl radially inward toward teeth of the inner ring in a staggered timing. For a transition mode, the actuation assembly is configured to rotate the strut within the first pocket such that rotation of the strut in the first rotational direction urges the first pawl radially inward into partial engagement with the teeth of the inner ring, the second pawl remains free of contact with the inner ring and the inner ring rotates in the first rotational direction.

In embodiments, to shift from the transition mode to a freewheel mode: the actuation assembly is arranged to rotate the strut in the second rotational direction such that the strut is no longer urging the first pawl radially inward; and the first pawl rotates into a biased retracted position free of contact with the teeth such that the inner ring is free to rotate in the first and the second rotational directions. Moreover, to shift from the transition mode to a locked mode: the inner ring is rotated in the second rotational direction forcing the first pawl into full engagement with the teeth of the inner ring; and the strut is rotated further in the first rotational direction such that further rotation of the strut urges the second pawl into full engagement with the teeth of the inner ring.

In embodiments, the actuation assembly may include an actuation plate configured to displace in a first axial direction or a second, opposite axial direction to rotate the strut within the first pocket. The first pocket may include a first wall and a second wall opposite the first wall connected via a circumferential wall. For the freewheel mode, the strut may contact the first wall of the first pocket. For the transition mode, the strut may be rotated in the first rotational direction to a position between the first and the second walls of the first pocket. For the locked mode, the strut may be rotated further in the first rotational direction such that the strut contacts the second wall of the first pocket.

Embodiments provide the advantageous benefit of a transition mode that allows for a "change of mind" of clutch engagement without any additional signal to the clutch.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
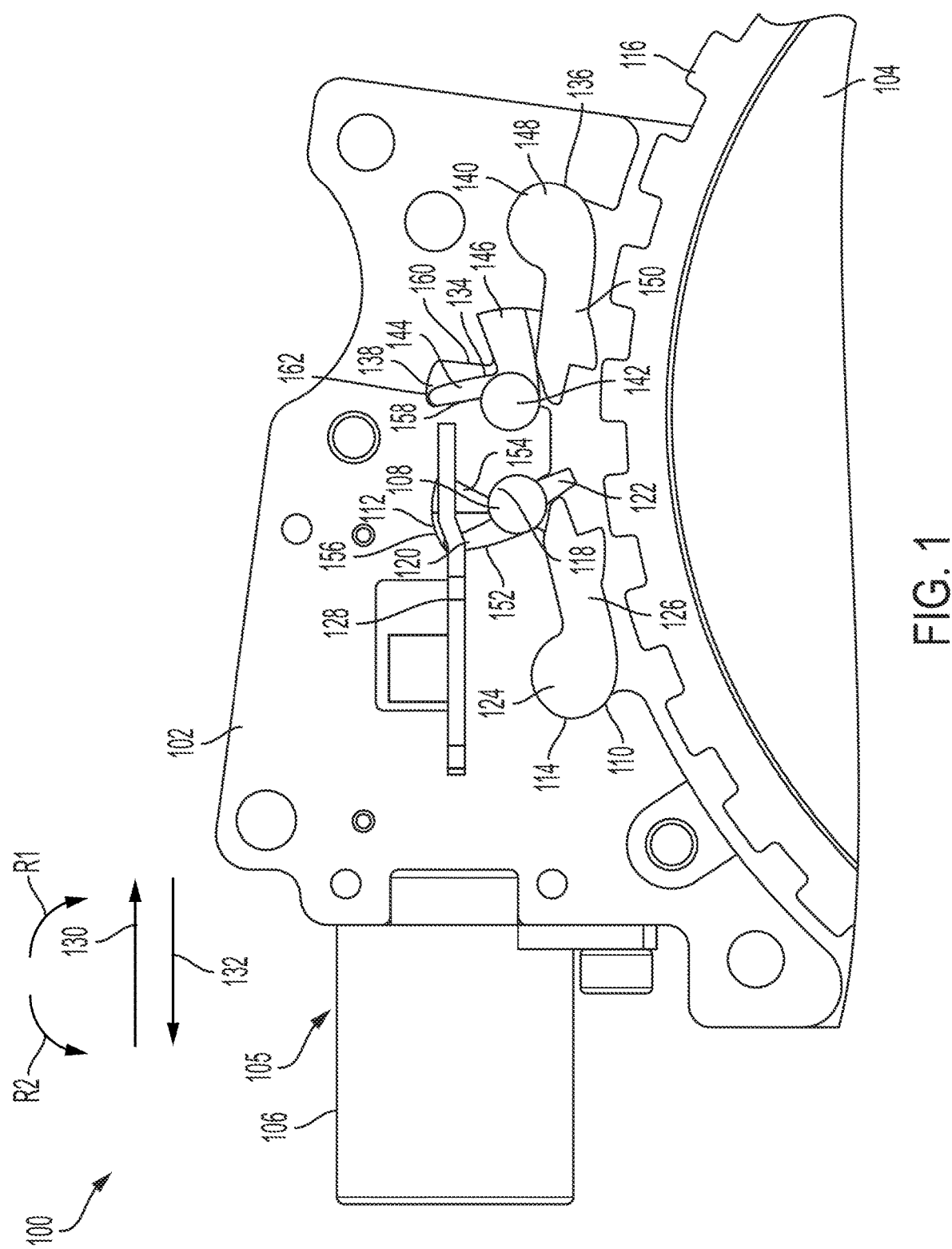
FIG. 1 is a cross-sectional view of a clutch assembly in a first, freewheel mode of operation.
Figure 2:
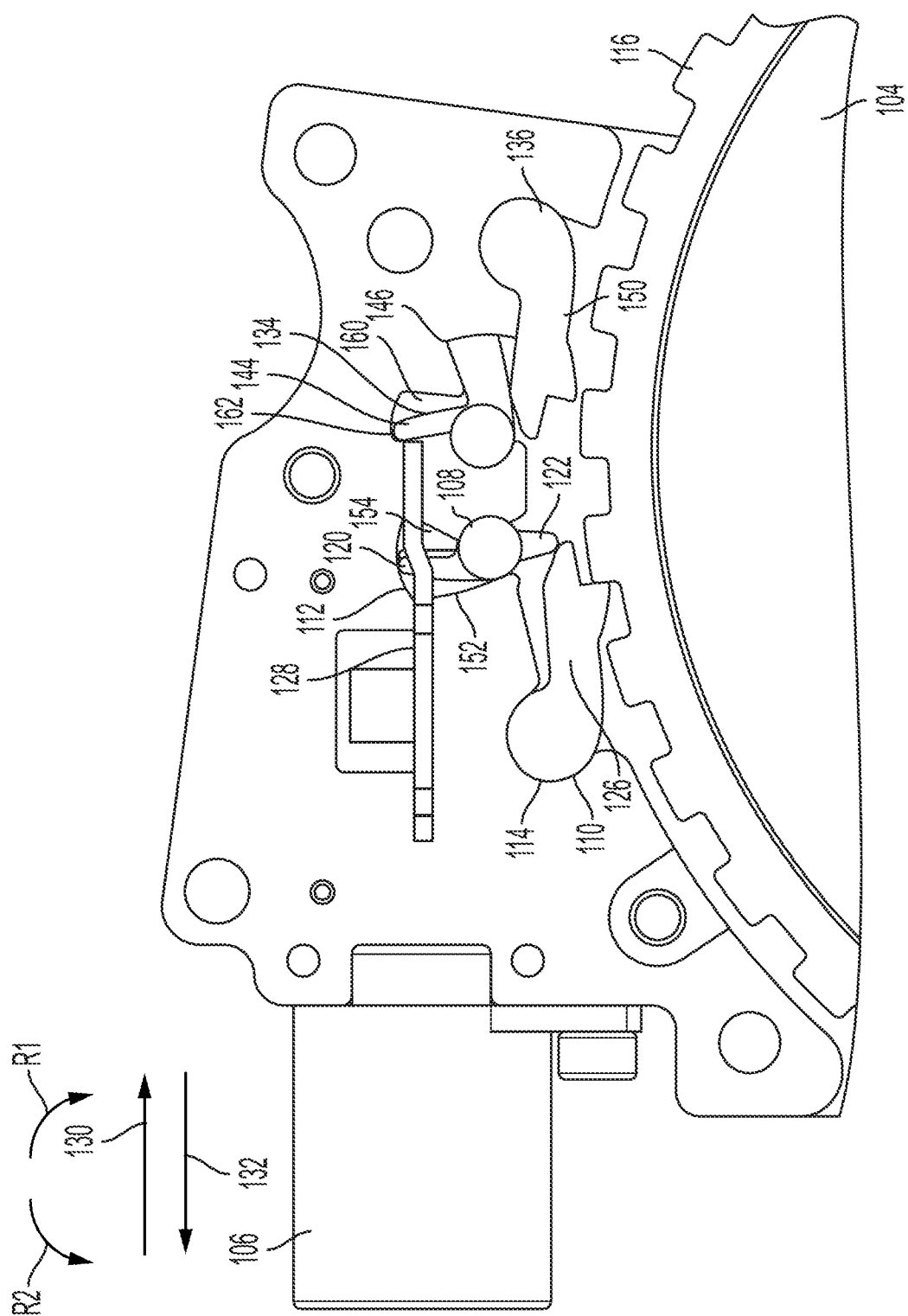
FIG. 2 is a cross-sectional view of the clutch assembly of FIG. 1 in a second, transition mode of operation.
Figure 3:
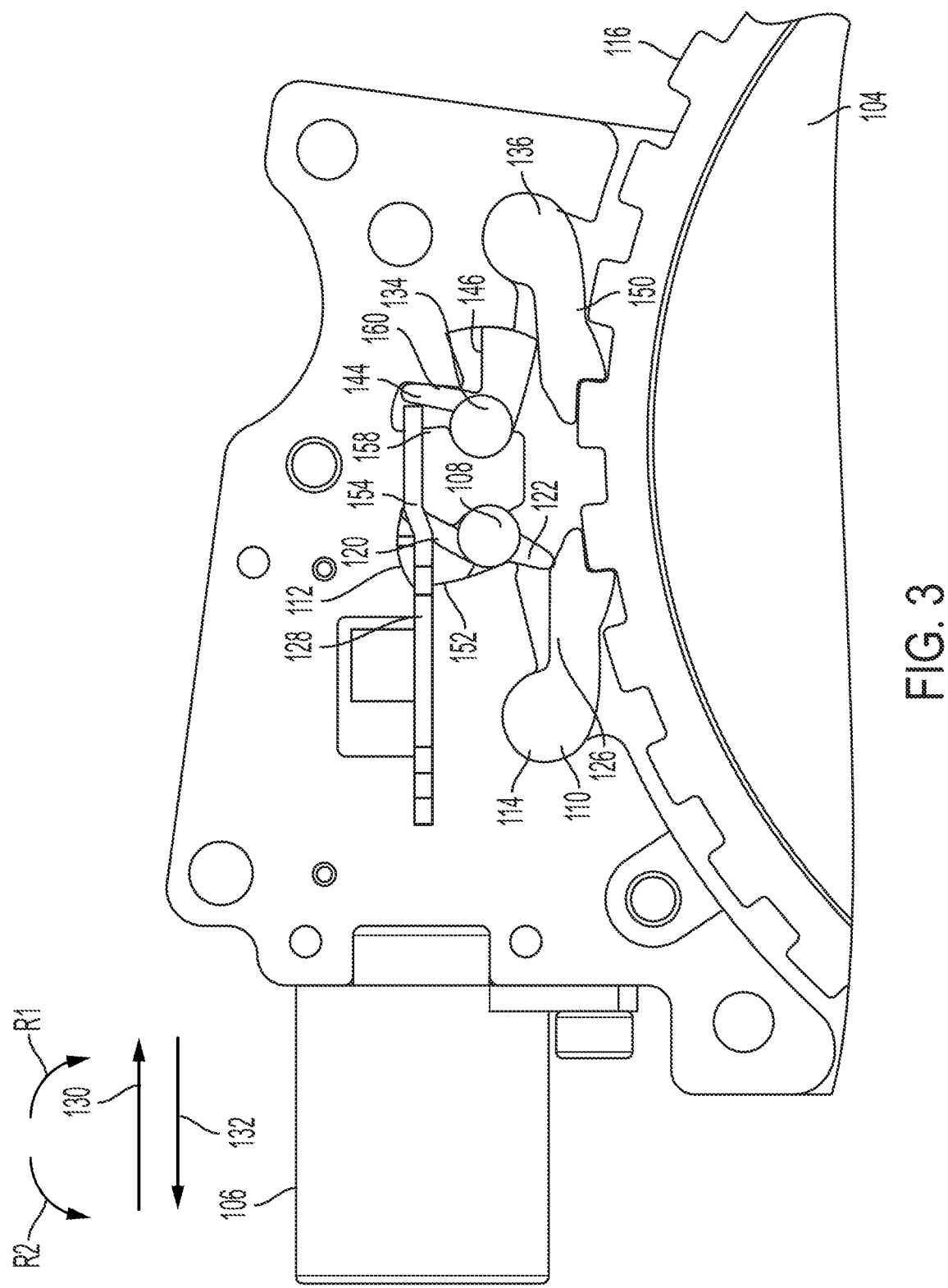
FIG. 3 is a cross-sectional view of the clutch assembly of FIG. 1 in a third, locked mode of operation.

FIG. 1 is a cross-sectional view of clutch assembly 100 in a first, freewheel (disengaged) mode of operation. FIG. 2 shows clutch assembly 100 in a second, transition mode of operation. FIG. 3 shows clutch assembly 100 in a third, locked (engaged) mode of operation. The following description is made with reference to FIGS. 1-3. Clutch assembly 100 includes outer ring 102, inner ring 104, and actuation assembly 105. Clutch assembly 100 includes a first rocker strut and pawl pair, or combination, comprised of first strut 108 and first pawl 110. First strut 108 and first pawl 110 are rotatably mounted in pockets, or recesses, 112 and 114, respectively, of outer ring 102. That is, first strut 108 and first pawl 110 are rotatable in a first rotational direction R1 and in a second rotational direction R2 opposite first rotational direction R1 via actuation assembly 105. First strut 108 and first pawl 110 may be retained in pockets 112 and 114 by spring elements (not shown) and biased in a first, freewheel position with respect to inner ring 104 (see, e.g., FIG. 1). In this position, first pawl 110 does not contact teeth 116 disposed on an outer surface of inner ring 104. First strut 108 may include body portion 118, flange 120 extending radially outward from body portion 118, and flange 122 extending radially inward toward inner ring 104. First pawl 110 may include body portion 124 and axially extending portion 126 extending in a substantially axial direction from body portion 124 toward flange 122 of first strut 108.

Actuation assembly 105 may include actuator 106 and actuator plate 128 that is configured to be actuated or moved in a first axial direction 130 or a second axial direction 132 opposite the first axial direction 130 via actuator 106, which may be a solenoid, for example. Actuator plate 128 is configured to actuate or rotate flange 120 of first strut 108 within pocket 112. First strut 108 and first pawl 110 are configured such that rotation of first strut 108 within pocket 112 forces or urges first pawl 110 to rotate toward teeth 116 of inner ring 104. That is, rotation of flange 120 of first strut 108 in first rotational direction R1 rotates flange 122 in first rotational direction R1 such that flange 122 urges axially extending portion 126 of first pawl 110 radially inward toward teeth 116 of inner ring 104 for engagement therebetween.

Clutch assembly 100 further comprises a second rocker strut and pawl pair, or combination, comprised of second strut 134 and second pawl 136. Second strut 134 and second pawl 136 are rotatably mounted in pockets, or recesses, 138 and 140, respectively, of outer ring 102. That is, second strut 134 and second pawl 136 are rotatable in first rotational direction R1 and second rotational direction R2. Second strut 134 and second pawl 136 may be retained in pockets 138 and 140 by spring elements (not shown) and biased in a first, disengaged position with respect to inner ring 104 (see, e.g., FIG. 1). In this position, second pawl 136 does not contact teeth 116 of inner ring 104. Second strut 134 may include body portion 142, flange 144 extending radially outward from body portion 142, and axially extending portion 146 extending in a substantially axial direction from body portion 142. Second pawl 136 may include body portion 148 and axially extending portion 150 extending in a substantially axial direction toward second strut 134. Second strut 134 is configured to be actuated or rotated within pocket 138 by actuator plate 128 of actuator 106. Second strut 134 and second pawl 136 are configured such that rotation of second strut 134 in first rotational direction R1 within pocket 138 forces or urges second pawl 136 radially inward toward teeth 116 of inner ring 104. That is, rotation of flange 144 of second strut 134 in first rotational direction R1 rotates axially extending portion 146 of second strut 134 in first rotational direction R1 such that axially extending portion 146 urges axially extending portion 150 of second pawl 136 radially inward toward teeth 116 of inner ring 104 for engagement therebetween.

Clutch assembly 100 is operable in a first mode that may be referred to as a disengaged, or freewheel, mode, a second mode that may be referred to as a transition mode (or "change of mind" mode), and a third mode that may be referred to as an engaged, or locked, mode. FIG. 1 shows the first mode of operation that may be described as the disengaged, freewheel mode. In the disengaged, freewheel mode, actuator plate 128 is in a first axial position and first strut 108 and first pawl 110 are biased in a first position in pockets 112 and 114, respectively. In the first position, first pawl 110 does not contact (not engaged with) teeth 116 of inner ring 104. That is, pocket 112 includes first and second axially opposite walls 152, 154 connected via circumferential wall 156 and flange 120 of first strut 108 contacts first wall 152 in the first position. Axially extending portion 126 further contacts and is biased against an inner surface of outer ring 102 such that a gap is formed between first pawl 110 and teeth 116 of inner ring 104.

Moreover, second strut 134 and second pawl 136 are also biased in a first position in pockets 138 and 140, respectively, such that second pawl 136 does not contact, or engage with, teeth 116 of inner ring 104. That is, pocket 138 includes first and second axially opposite walls 158, 160 connected by circumferential wall 162 and flange 144 of second strut 134 contacts, and is biased against, first wall 158 in the first position. Axially extending portion 150 further contacts and is biased against the inner surface of outer ring 102 such that a gap is formed between second pawl 136 and teeth 116 of inner ring 104. In the first mode of operation, the freewheel mode, inner ring 104 is free to rotate in both first rotational direction R1 and second rotational direction R2.

FIG. 2 shows the second mode of operation for clutch assembly 100 that may be referred to as a transition, or change of mind, mode. In this second mode, first strut 108 and first pawl 110 are actuated to a second position by actuation assembly 105. First strut 108 may be actuated to the second position by actuator plate 128. That is, actuator 106 is configured to displace actuator plate 128 when powered on in first axial direction 130 to a second axial position to rotate flange 120 of first strut 108 in first rotational direction R1 to a position between first wall 152 and second wall 154 such that flange 120 does not contact either wall. When flange 120 rotates, flange 122 also rotates in rotational direction R1 and urges, or forces, axially extending portion 126 of first pawl 110 radially inward such that axially extending portion 126 contacts teeth 116 but does not fully engage, or lock, with inner ring 104. Inner ring 104 rotates in first rotational direction R1.

Moreover, in this transition mode, second strut 134 and second pawl 136 remain in the first position where second pawl 136 remains free of contact with teeth 116 of inner ring 104. This means that a "change of mind" is still possible without any additional signal to the clutch assembly 100. For example, if it is decided that full engagement with inner ring 104 isn't desired, then turning off power to actuator 106 will result in actuator plate 128 moving in axial direction 132 from the second axial position (shown in FIG. 2) back to the first axial position (shown in FIG. 1) with first strut 108 and first pawl 110 rotating back from the second position (shown in FIG. 2) to the first position (shown in FIG. 1). Likewise, if full engagement with inner ring 104 to prevent rotation thereof in both directions is desired, then a reverse torque may be applied to lock first pawl 110 with inner ring 104. That is, if inner ring 104 is rotating in first rotational direction R1 during the transition mode (i.e., first pawl 110 is ratcheting), then changing rotational directions of inner ring 104 to rotate in second rotational direction R2 will force first pawl 110 to lock with inner ring 104 (shown in FIG. 3). This transition mode is an advantageous benefit of the embodiments disclosed herein. For example, in a transmission application, this would allow for a driver to press on the brake and then change its mind by releasing the brake and depressing the gas pedal. This transition mode allows for a "change of mind" without any additional signal to the clutch. What this means is, first pawl 110 is in position to lock with inner ring 104 and will ratchet until either a reverse torque is applied to fully lock second pawl 110 with inner ring 104 or power is turned off to actuator 106 such that actuator plate 128 returns to the first position.

FIG. 3 shows the third mode of operation for clutch assembly 100 that may be referred to as an engaged, locked mode. In the engaged, locked mode, inner ring 104 is prevented from rotation in both rotational direction R1 and in rotational direction R2. In this mode, first strut 108 and first pawl 110 are actuated to a third position. To transition from the second mode of operation (see FIG. 2), a reverse torque is applied such that inner ring 104 is forced to rotate in the opposite rotational direction. That is, inner ring 104 is rotating in first rotational direction R1 in the second mode and is rotated in second rotational direction R2 such that first pawl 110 and in particular axially extending portion 126 is drawn completely into teeth 116 of inner ring 104 for full engagement therewith. Rotation of first pawl 110 into full engagement with teeth 116 allows flange 122 of first strut 108 to rotate to a position between axially extending portion 126 and outer ring 102. In turn, flange 120 of first strut 108 is rotated to a third position within pocket 112 wherein flange 120 contacts second wall 154. Actuator plate 128 is further displaced to a third axial position to rotate second strut 134 within pocket 138.

Moreover, in this third mode, second strut 134 and second pawl 136 are now rotated from a first position (shown in FIGS. 1-2) to a second position where second pawl 136 engages with teeth 116 of inner ring 104 to stop motion in the opposite direction. Second strut 134 is rotated within pocket 138 from the first position (shown in FIGS. 1-2) to the second position (shown in FIG. 3) by actuating element or plate 128. That is, displacement of actuating element or plate 128 to the third axial position rotates second strut 134 in rotational direction R1 where in turn, second strut 134 rotates second pawl 136 to engage with teeth 116 of inner ring 104. That is, flange 144 of second strut 134 contacts wall 160 in the second position and axially extending portion 146 urges axially extending portion 150 radially inward into engagement with teeth 116 of inner ring 104.

Figure 4:
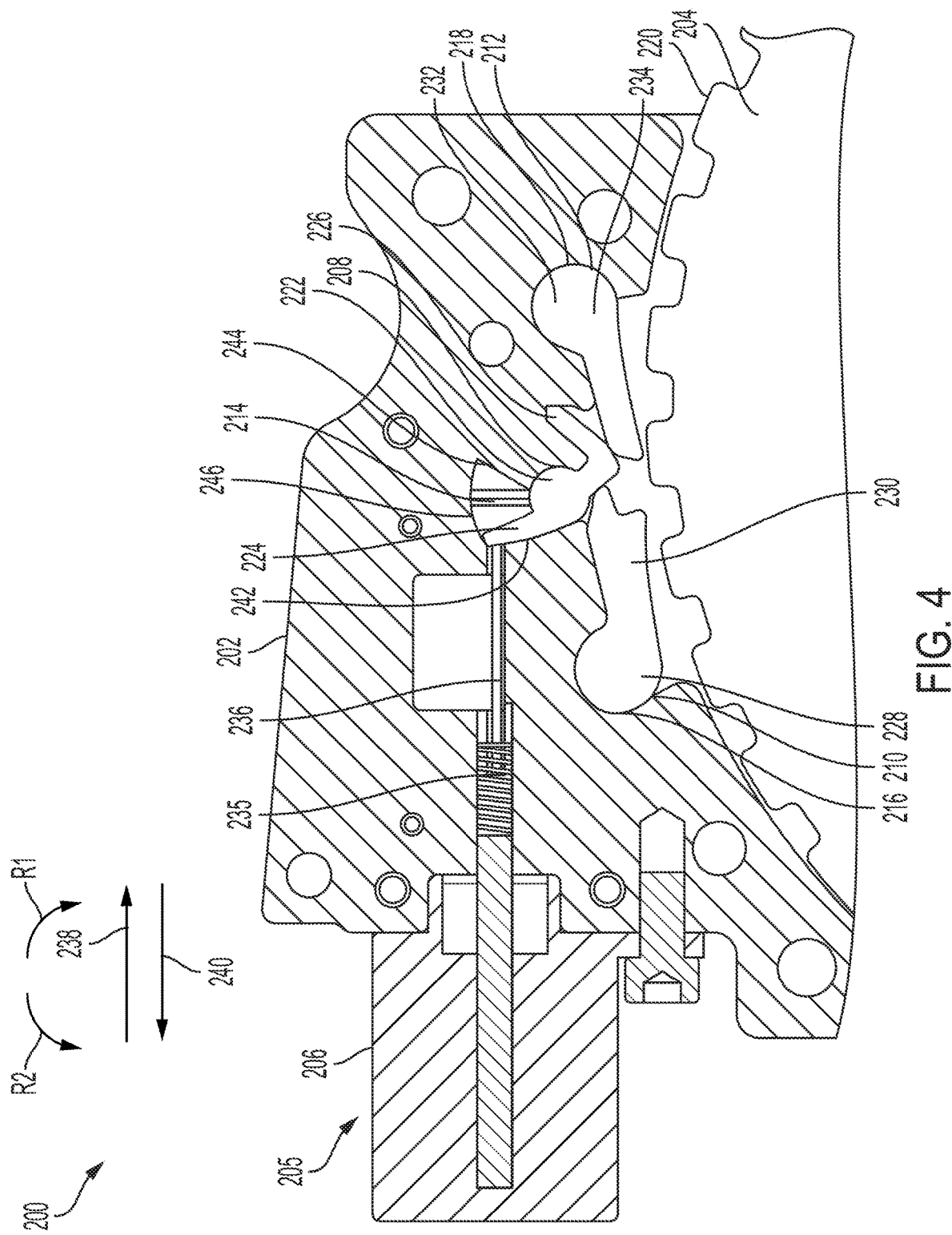
FIG. 4 is a cross-sectional view of an alternate embodiment of a clutch assembly in a first, freewheel mode of operation.
Figure 5:
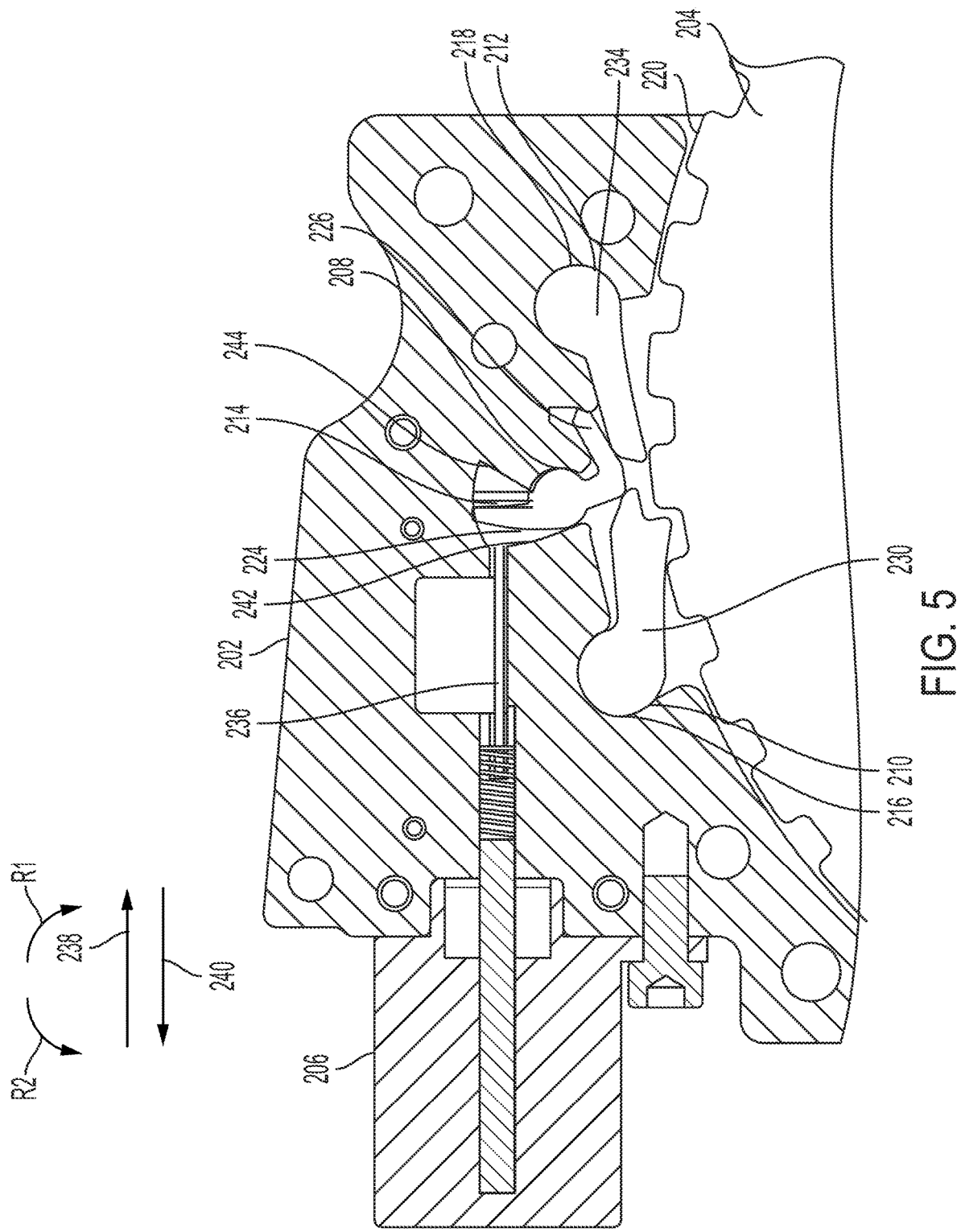
FIG. 5 is a cross-sectional view of the clutch assembly of FIG. 4 in a second, transition mode of operation.
Figure 6:
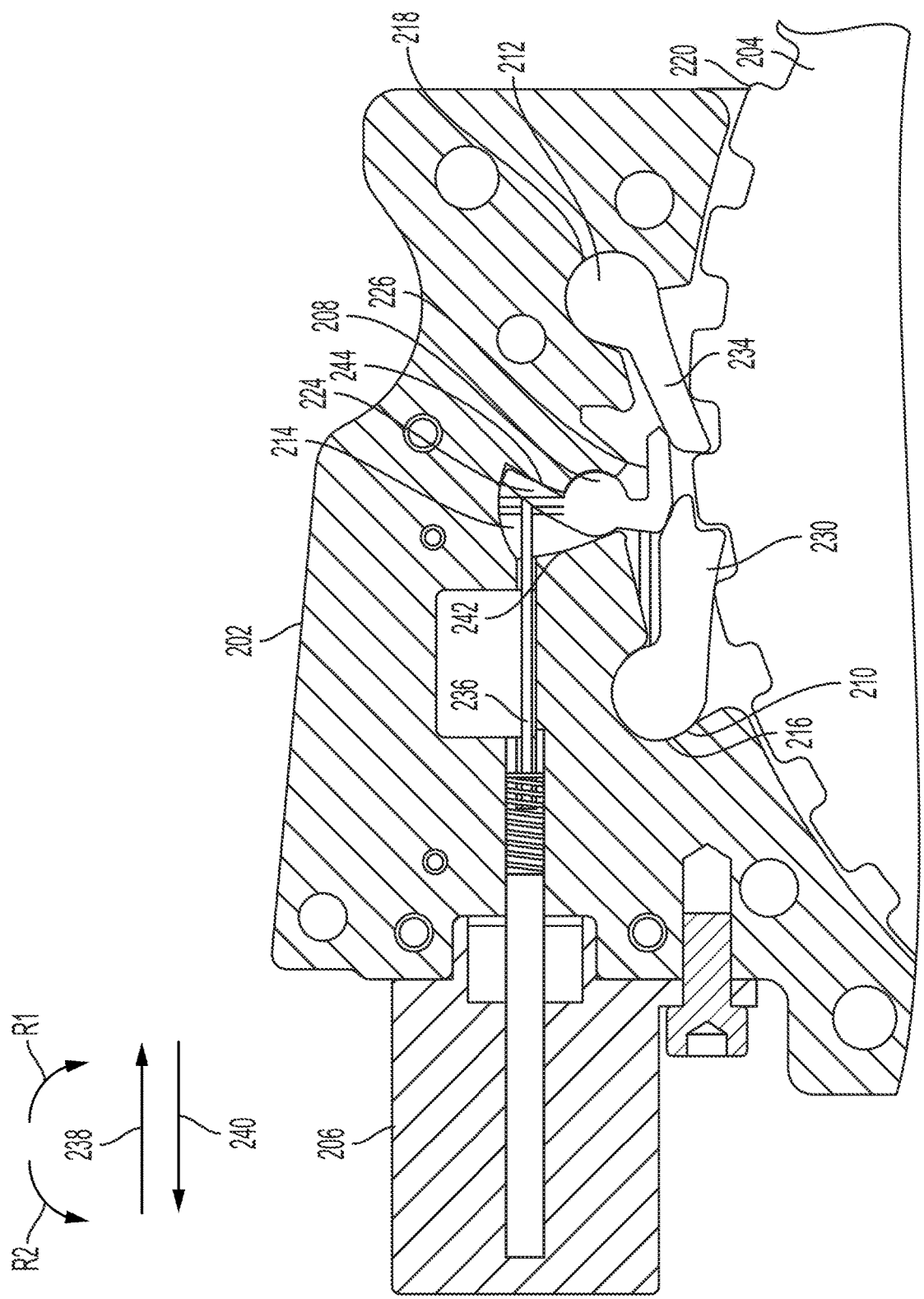
FIG. 6 is a cross-sectional view of the clutch assembly of FIG. 4 in a third, locked mode of operation.

FIG. 4 shows an alternate embodiment of a clutch assembly 200 in a first, freewheel mode of operation. FIG. 5 shows clutch assembly 200 in a second, transition mode of operation. FIG. 6 shows clutch assembly 200 in a third, locked mode of operation. The following description is in reference to FIGS. 4-6. Clutch assembly 200 includes outer ring 202, inner ring 204, actuation assembly 205, strut 208, first pawl 210, and second pawl 212. Strut 208 may be rotatably mounted in pocket, or recess, 214 of outer ring 202. Strut 208 may be biased in a first, disengaged position within pocket 214 by a spring element (not shown). Similarly, first pawl 210 and second pawl 212 may be rotatably mounted within pockets, or recesses 216, 218, respectively. First pawl 210 and second pawl 212 may be biased in a first, disengaged position within pockets 216, 218, respectively, by spring elements (not shown).

In this position, first pawl 210 and second pawl 212 do not contact teeth 220 disposed on an outer surface of inner ring 204 such that inner ring 204 is free to rotate in both first rotational direction R1 and second rotational direction R2. Strut 208 may include body portion 222, flange 224 extending radially outward from body portion 222, and flange 226 extending radially inward toward inner ring 204 and axially toward second pawl 212. Flange 226 may be designed as an L-shaped design, for example. First pawl 210 may include body portion 228 and axially extending portion 230 extending in a substantially axial direction from body portion 228 toward strut 208. Second pawl 212 may include body portion 232 and axially extending portion 234 extending in a substantially axial direction from body portion 232 toward strut 208.

The main difference between clutch assembly 200 and clutch assembly 100 (shown in FIGS. 1-3) is that in clutch assembly 200, a single strut 208 is used to actuate first pawl 210 and second pawl 212. Whereas, clutch assembly 100 uses two struts 108, 134 to actuate first pawl 110 and second pawl 136.

Actuation assembly 205 may include actuator 206, spring 235, and actuator plate 236 that is configured to be actuated or moved in a first axial direction 238 or a second axial direction 240 opposite the first axial direction 238 via compression of spring 235. Actuator 206 may be a solenoid, for example. Actuator plate 236 is configured to actuate or rotate flange 224 of strut 208 within pocket 214. Strut 208 is arranged and configured to be actuated to rotate first pawl 210 within pocket 216 and second pawl 212 within pocket 218 to engage with teeth 220 of inner ring 204. Strut 208 is further is arranged and designed such that it actuates or rotates first pawl 210 and second pawl 212 in a staggered timing manner to allow for a second, transition mode of operation. For example, strut 208 may include a design feature, such as flange portion 226 where actuation of strut 208 from a first position to a second position would in turn actuate first pawl 210 to a second position without actuation of second pawl 212. And then further rotation of strut 208 to a third position within pocket 214 would then actuate second pawl 212 to a second position. This will be further clarified as the modes of operation of clutch assembly 200 are explained more fully below.

Like clutch assembly 100 (shown in FIGS. 1-3), clutch assembly 200 is operable in a first mode that may be referred to as a disengaged, or freewheel, mode; a second mode that may be referred to as a transition mode (or "change of mind" mode); and a third mode that may be referred to as an engaged, or locked, mode. FIG. 4 shows the first mode of operation that may be described as the disengaged, freewheel mode. In the disengaged, freewheel mode, strut 208, first pawl 210, and second pawl 212 are biased in a first position in pockets 214, 216, and 218, respectively. In the first position, pawls 210 and 212 do not contact (not engaged with) teeth 220 of inner ring 204. Actuator plate 236 is also in a first position. That is, pocket 214 includes first and second axially opposite walls 242, 244 connected via circumferential wall 246 and flange 224 of strut 208 contacts first wall 242 in the first position. Axially extending portion 226 further contacts and is biased against an inner surface of outer ring 202 such that a gap is formed between first pawl 210, second pawl 212 and teeth 220 of inner ring 204. In the first mode of operation, the disengaged position, inner ring 204 is free to rotate in rotational direction R1 or rotational direction R2.

FIG. 5 shows the second mode of operation for clutch assembly 200 that may be referred to as a transition, or change of mind, mode. In this second mode, strut 208 and first pawl 210 are actuated to a second position. Strut 208 may be actuated to the second position by actuator 206. That is, actuator 206 is configured to displace actuator plate 236 to a second axial position when powered on to rotate flange 224 of strut 208 in first rotational direction R1 to a position between first wall 242 and second wall 244 such that flange 224 does not contact either wall. When flange 224 rotates, flange 226 also rotates in first rotational direction R1 and urges, or forces, axially extending portion 230 of first pawl radially inward such that axially extending portion 230 contacts teeth 220 but does not fully engage, or lock, with inner ring 204. What this means is, first pawl 210 is in position to lock with inner ring 204 if a reverse torque is applied. Inner ring 204 rotates in first rotational direction R1.

Moreover, in this transition mode, second pawl 212 remains in the first position where second pawl 212 remains free of contact with teeth 220 of inner ring 204. This means that a "change of mind" is still possible without any additional signal to the clutch assembly 200. For example, if it is decided that full engagement isn't desired, then turning off power to actuator 206 will result in actuator plate 236 moving in axial direction 240 from the second axial position (shown in FIG. 5) back to the first axial position (shown in FIG. 4) with strut 208 and first pawl 210 rotating back from the second position (shown in FIG. 5) to the first position (shown in FIG. 4). Likewise, if full engagement with inner ring 204 to prevent rotation thereof is desired, then a reverse torque may be applied to lock first pawl 210 with inner ring 204. That is, if inner ring 204 is rotating in first rotational direction R1 during the transition mode (i.e., first pawl 210 is ratcheting), then changing rotational directions of inner ring 204 to rotate in second rotational direction R2 will force first pawl 210 to lock with inner ring 204 (shown in FIG. 6). This transition mode is an advantageous benefit of the embodiments disclosed herein. For example, in a transmission application, this would allow for a driver to press on the brake and then change its mind by releasing the brake and depressing the gas pedal. This transition mode allows for a "change of mind" without any additional signal to the clutch.

FIG. 6 shows the third mode of operation for clutch assembly 200 that may be referred to as an engaged, locked mode. In the engaged, locked mode, inner ring 204 is prevented from rotation in both first rotational direction R1 and in second rotational direction R2. In this mode, strut 208 and first pawl 210 are actuated to a third position. To transition from the second mode of operation (see FIG. 5), a reverse torque is applied such that inner ring 204 is forced to rotate in the opposite rotational direction. That is, inner ring 204 is rotating in first rotational direction R1 in the second mode and to transition to the third mode, inner ring 204 is rotated in second rotational direction R2 such that first pawl 210 and in particular axially extending portion 230 is drawn completely into teeth 220 of inner ring 204 for full engagement therewith. Rotation of first pawl 210 into full engagement with teeth 220 allows flange 226 of strut 208 to rotate to a position between axially extending portion 230 and outer ring 202. In turn, actuator plate 236 is further displaced to a third axial position and flange 224 of strut 208 is rotated to a third position within pocket 214 wherein flange 224 contacts second wall 244.

Moreover, in this third mode, when strut 208 is actuated to the third position, strut 208 in turn now rotates second pawl 212 from the first position (shown in FIGS. 4-5) to a second position where second pawl 212 engages with teeth 220 of inner ring 204 to stop motion in an opposite direction. That is, flange 226 rotates axially extending portion 234 radially inward such that axially extending portion 234 engages with teeth 220. In this way, strut 208 facilitates staggered actuation, or rotation, of first pawl 210 and second pawl 212.

Embodiments disclosed herein provide several advantages such as a transition mode that allows for a "change of mind" without any additional signal to the clutch. Additionally, embodiments of the present disclosure reduce and/or eliminate reaction loads in one direction to the other.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

- 100 clutch assembly
- 102 outer ring
- 104 inner ring
- 105 actuation assembly
- 106 actuator
- 108 first strut
- 110 first pawl
- 112 pocket
- 116 teeth
- 118 body portion
- 120 flange
- 122 flange
- 124 body portion
- 126 axially extending portion
- 128 actuator plate
- 130 first axial direction
- 132 second axial direction
- 134 second strut
- 136 second pawl
- 138 pocket
- 142 body portion
- 144 flange
- 146 axially extending portion
- 148 body portion
- 150 axially extending portion
- 152 first wall
- 154 second wall
- 156 circumferential wall
- 158 first wall
- 160 second wall
- 162 circumferential wall
- 200 clutch assembly
- 202 outer ring
- 204 inner ring
- 205 actuation assembly
- 206 actuator
- 208 strut
- 210 first pawl
- 212 second pawl
- 214 pocket
- 216 pocket
- 218 pocket
- 220 teeth
- 222 body portion
- 224 flange
- 226 flange
- 228 body portion
- 230 axially extending portion
- 232 body portion
- 234 axially extending portion
- 235 spring
- 236 actuator plate
- 238 first axial direction
- 240 second axial direction
- 242 first wall
- 244 second wall
- 246 circumferential wall

What is claimed is:

1. A clutch assembly comprising:
   an actuation assembly;
   an outer ring;
   an inner ring disposed radially inward of the outer ring and rotatable about an axis in a first rotational direction and a second rotational direction opposite the first rotational direction;
   a first strut and a second strut rotatably disposed within a first pocket and a second pocket, respectively, of the outer ring, wherein the first strut and the second strut are configured to be rotated by the actuation assembly; and
   a first pawl and a second pawl rotatably disposed within a third pocket and a fourth pocket, respectively, of the outer ring, wherein the first pawl is arranged to be rotated by the first strut and the second pawl is arranged to be rotated by the second strut;
   wherein:
   for a transition mode, the actuation assembly is configured to rotate the first strut within the first pocket such that rotation of the first strut in the first rotational direction urges the first pawl radially inward into partial engagement with teeth disposed on an outer surface of the inner ring, the second pawl remains free of contact with the inner ring and the inner ring rotates in the first rotational direction.

2. The clutch assembly of claim 1, wherein to shift from the transition mode to a freewheel mode:
   the actuation assembly is arranged to rotate the first strut in the second rotational direction such that the first strut is no longer urging the first pawl radially inward; and
   the first pawl rotates into a biased retracted position free of contact with the teeth such that the inner ring is free to rotate in the first and the second rotational directions.

3. The clutch assembly of claim 2, wherein to shift from the transition mode to a locked mode:
   the inner ring is rotated in the second rotational direction forcing the first pawl into full engagement with the teeth of the inner ring;
   the first strut is rotated further in the first rotational direction; and
   the actuation assembly is arranged to rotate the second strut in the first rotational direction such that rotation of the second strut urges the second pawl into full engagement with the teeth of the inner ring.

4. The clutch assembly of claim 3, wherein the actuation assembly includes an actuation plate configured to displace in a first axial direction or a second, opposite axial direction to rotate the first strut and the second strut within the first pocket and the second pocket, respectively.

5. The clutch assembly of claim 3, wherein the first pocket and the second pocket each include a first wall and a second wall opposite the first wall connected via a circumferential wall.

6. The clutch assembly of claim 5, wherein:
   for the freewheel mode, the first strut contacts the first wall of the first pocket and the second strut contacts the first wall of the second pocket;
   for the transition mode, the first strut is rotated in the first rotational direction to a position between the first and the second walls of the first pocket and the second strut contacts the first wall of the second pocket; and
   for the locked mode, the first strut is rotated further in the first rotational direction such that the first strut contacts the second wall of the first pocket and the second strut is rotated in the first rotational direction such that it contacts the second wall of the second pocket.

7. A clutch assembly, comprising:
an actuation assembly;
an outer ring;
an inner ring disposed radially inward of the outer ring and rotatable about an axis in a first rotational direction and a second rotational direction opposite the first rotational direction;
a strut rotatably disposed within a first pocket of the outer ring, wherein the actuation assembly is arranged to rotate the strut within the first pocket; and
a first pawl and a second pawl rotatably disposed within a second pocket and a third pocket, respectively, of the outer ring, wherein the strut is configured to urge the first pawl and the second pawl radially inward toward teeth of the inner ring in a staggered timing;
wherein:
for a transition mode, the actuation assembly is configured to rotate the strut within the first pocket such that rotation of the strut in the first rotational direction urges the first pawl radially inward into partial engagement with the teeth of the inner ring, the second pawl remains free of contact with the inner ring and the inner ring rotates in the first rotational direction.

8. The clutch assembly of claim 7, wherein to shift from the transition mode to a freewheel mode:
the actuation assembly is arranged to rotate the strut in the second rotational direction such that the strut is no longer urging the first pawl radially inward; and
the first pawl rotates into a biased retracted position free of contact with the teeth such that the inner ring is free to rotate in the first and the second rotational directions.

9. The clutch assembly of claim 8, wherein to shift from the transition mode to a locked mode:
the inner ring is rotated in the second rotational direction forcing the first pawl into full engagement with the teeth of the inner ring;
the strut is rotated further in the first rotational direction such that further rotation of the strut urges the second pawl into full engagement with the teeth of the inner ring.

10. The clutch assembly of claim 9, wherein the actuation assembly includes an actuation plate configured to displace in a first axial direction or a second, opposite axial direction to rotate the strut within the first pocket.

11. The clutch assembly of claim 9, wherein the first pocket includes a first wall and a second wall opposite the first wall connected via a circumferential wall.

12. The clutch assembly of claim 11, wherein:
for the freewheel mode, the strut contacts the first wall of the first pocket;
for the transition mode, the strut is rotated in the first rotational direction to a position between the first and the second walls of the first pocket; and
for the locked mode, the strut is rotated further in the first rotational direction such that the strut contacts the second wall of the first pocket.

* * * * *